F. W. HANNEMAN.
SEAT UPHOLSTERY FOR VEHICLES.
APPLICATION FILED DEC. 4, 1919.
1,431,581. Patented Oct. 10, 1922.
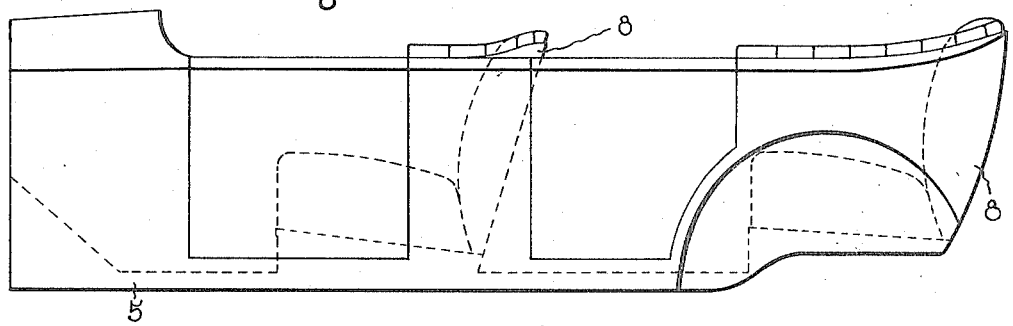
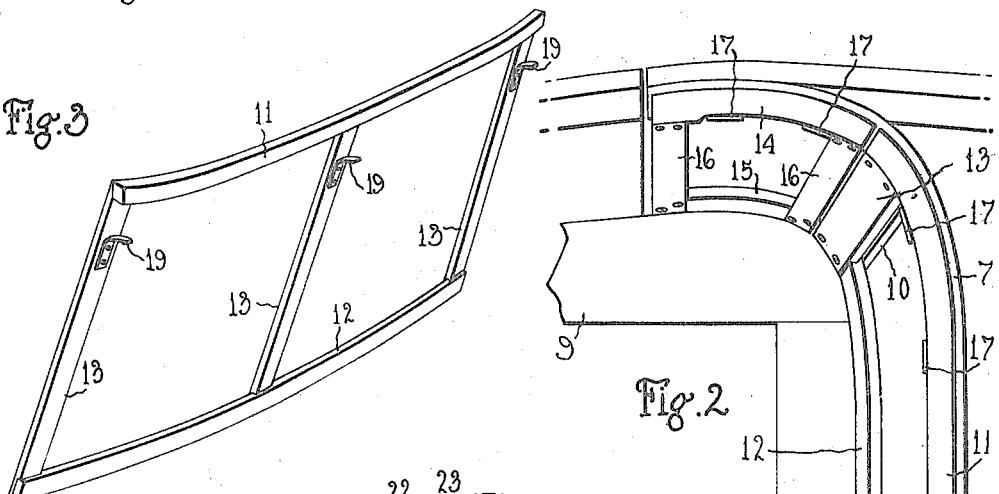
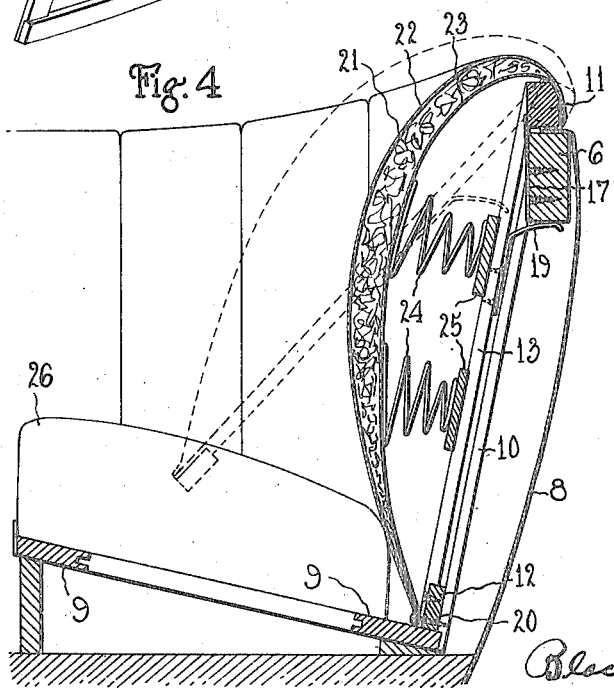
Inventor
Fred W. Hanneman
Attorneys Patented Oct. 10, 1922.

1,431,581

UNITED STATES PATENT OFFICE.

FRED W. HANNEMAN, OF PONTIAC, MICHIGAN, ASSIGNOR TO GENERAL MOTORS CORPORATION, OF DETROIT, MICHIGAN, A CORPORATION OF DELAWARE.

SEAT UPHOLSTERY FOR VEHICLES.

Application filed December 4, 1919. Serial No. 342,446.

*To all whom it may concern:*

Be it known that I, FRED W. HANNEMAN, a citizen of the United States, and a resident of Pontiac, county of Oakland, and State of Michigan, have invented certain new and useful Improvements in Seat Upholstery for Vehicles, of which the following is a full, clear, concise, and exact description, such as will enable others skilled in the art to which the invention relates to make and use the same, reference being made therein to the accompanying drawings, which form a part of this specification.

My invention relates to the bodies of automobiles and similar vehicles, and particularly to the seat or seats thereof, and to the upholstery provided for the seats.

The principal object of my invention is to provide improved upholstery for vehicle seats in which the upholstery for the back and side portions of the seat is carried upon a separate and distinct frame or frames which, with the upholstery in place thereupon, may be placed in proper relation to the seat and to various elements of the vehicle body and then secured in place, or as readily removed from the vehicle body should it become necessary to clean or repair the upholstery, or should it be deemed desirable to remove the same from the seat structure for any reason whatever.

A further object of my invention is to provide seat upholstery for motor and other types of vehicles in which the upholstery for the back and side portions of the seat may be installed upon frames of proper form which are entirely separate and distinct from the vehicle body and seat thereof, and which frame or frames with the upholstering thereupon may then be placed in proper position and secured in place relative to the vehicle body to thereby provide back upholstery for the seat; the frame with its upholstering thus forming a unitary article or structure which may be made outside the vehicle body and apart therefrom.

My invention is illustrated in its preferred form in the drawing accompanying and forming a part of this specification; although it will be appreciated that various changes and modifications may be made in the particular embodiment of my invention illustrated without departing from the spirit thereof, so long as such assumed changes come within the scope of the concluding claims, wherein the particular features in which my invention consists are pointed out at length.

Referring to the drawing:

Fig. 1 is a view showing a motor vehicle body in side elevation, and for the most part in a conventional manner.

Fig. 2 is a fragmentary view showing a portion of the vehicle body, and of the seat supporting frame installed therein; and illustrating the relation of the frames which carry the seat upholstery in which my invention consists relative to the seat frame, and to certain portions of the vehicle body.

Fig. 3 is a perspective view showing the frame upon which the upholstery for the back of the seat is placed and whereby it is carried.

Fig. 4 is a fragmentary view showing the manner in which the back upholstery is secured to and carried by the frame shown in Fig. 3, and the manner in which the frame and back upholstery carried thereby is put in place and removed.

Fig. 5 is a fragmentary view showing a slightly different arrangement of certain of the elements of my invention.

Referring now to the drawing, the body 5 of the vehicle may be of any form, and may have any of the elements and features of construction at present commonly used in motor vehicle bodies; among which elements are upper rails 6 for the back seat and 7 for the front seat, as best shown in Figs. 2, 4 and 5. These rails extend transverse to the vehicle body and are located at the upper portion thereof and rails of the form illustrated or the equivalent thereof are commonly present in ordinary forms of vehicle bodies and constitute a portion of the framework covered by and to which the sheet metal cover 8 is secured; although such upper rails vary somewhat in form and in position, and as to their particular arrangement relative thereto, in various specific forms of vehicle body.

The vehicle body 5 is also equipped with the usual seat cushion supporting frame 9 variously constructed in different forms of body, and with the particular form of which my invention is in no way concerned; while the reference numeral 10 designates bars extending between the top rails 6, 7 and the seat frame to thereby tie said elements together and contribute generally to the rigidity of the frame of the vehicle body to which the sheet metal cover is commonly secured. It will be appreciated that members such as are above referred to are commonly present in one form or another in the framework of motor vehicle bodies of common and conventional form and such as are at present in use; and that the arrangement of said elements or their equivalents relative to one another and to the frame of the body will vary in different vehicle bodies within certain limits, and that the invention to which this present application relates is in no way concerned with the particular form and arrangement of the vehicle body elements and features above referred to.

The separate and independent framework or frame member to which the upholstery for the back of the seat is secured, and whereby the said upholstery is carried is shown separate and by itself in Fig. 3; the same comprising a top rail 11 adapted, when the back upholstery is in place, to lie above one of the transversely extending upper rails 6 or 7 according to which seat the back upholstery is provided for, a bottom rail 12 which when the back upholstery is in place lies adjacent the seat frame 9, and a plurality of upright bars 13 extending between the top and bottom rails aforesaid and the ends of which are secured to said rails, to thereby provide a unitary frame structure. The shape or outline of this frame member will obviously vary in different vehicle bodies and will depend upon the form, style, or other features of the body; the frame being of such a form as to fit within the body and provide the requisite form of seat in each particular instance.

The upholstery carrying frames which are at the two ends or sides of the seat are in all essential particulars identical with the frame at the back of the seat, although their form, curvature, and other subordinate features will vary from that of the back frame and will in each case be such that the end frames will fit properly within the body and form the side or end upholstery of the seat. Thus the upholstery supporting frames for the upholstery at the ends of the seat shown in Fig. 2 comprises upper and lower frame members 14, 15 connected together by two bars 16, the ends of which are secured to the said top and bottom rails; and in this connection it will be appreciated that both the frames for the back upholstery as well as for the side or seat end upholstery will have as many vertical extending bars such as 13 or 16 as may be deemed necessary or desirable in each particular case.

The top rail 11 when a frame is in place within a motor vehicle body overlies the upper rails 6, 7 and is supported by the rail of the particular seat which a given frame is designed for; and said upper rails are provided with stop members 17, as many as may be deemed necessary or desirable in each particular case, the free ends of which stop members extend above the upper edges of said upper rails and lie in front of the top rail 11 when the back frame with the upholstery thereupon is in place. These projecting upper ends of the stops act to prevent forward movement of the top rail 11 and of the frame of which they form a part, thus holding the back upholstery carried by said frame in proper position relative to the remaining portion of the seat. The upper ends of the vertical extending bars 13 engage the front sides of the rails 6, 7 and thereby prevent backward movement of the upholstery supporting frame and the upholstery supported thereby, as best shown in Figs. 4 and 5.

The vertically extending bars 13 are preferably provided with resilient clips 19 substantially right-angular in form and the free ends of which engage the under side of the top rails 6, 7 when the upholstery supporting frame is in place, to thereby more securely hold the frame and upholstery carried thereby in position and prevent upward movement thereof. The frame and upholstery supported thereby may if desired be more securely held in place by screws 20 at the lower end of the frame and which screws extend into the vertically extending bars 10 of the frame of the vehicle body above referred to. The screws need not, however, be used in all cases, as when the cushion 26 of the seat is in place it will engage the lower portion of the back, and the lower ends of the side upholstery, and hold the entire back and end upholstery in place relative to the framework of the vehicle whereby the frames which carry said upholstery are supported.

The above description has referred particularly to the structural features of the frame or frames whereby the back and side upholstery for the seat is carried apart for the most part from the upholstery itself, although it will be appreciated that suitable upholstery is secured to these frames in order to provide completely upholstered seat units.

Such upholstery, however, may be of any of the types or forms at present in use in the making of vehicle seats such, for example, as the upholstery shown in Fig. 4, which comprises a mattress 21 having external and internal fabric coverings 22 and 23 and which mattress extends across and is supported by the free ends of coil springs 24 carried by transversely extending bars 25 secured to the bars 13 of the upholstery supporting frame; the upper end of said mattress being secured to the top rail 11, the lower end thereof to the lower portion of the frame or to the bottom rail 12 thereof, and the side portion thereof to the two side ones of the vertically extending bars 13; thereby providing a unitary seat upholstery unit which may be readily placed in position and made to form a section of the seat upholstery, and as readily removed from the body of the vehicle should it become necessary or desirable to do so.

It will be appreciated from the foregoing that the upholstery for the back and sides or ends of a seat may be conveniently built up and installed upon one or more frames outside of and apart from the vehicle body, which frames may then be put in place in a vehicle body and properly secured therein to provide the back upholstery for the seat. The number of separate frames employed with each seat may obviously vary in different types of vehicle bodies; and in some cases it may be unnecessary to make the upholstery for the side or ends of the seat removable. These, however, are obvious variations of my invention and in no way affect the essential features thereof which are particularly pointed out in the following claims. It will also be appreciated that while I have illustrated my invention as applied to an automobile having an open top body the same is equally capable of use with closed bodies, and in fact with any kind or type of vehicle body having an upholstered seat or seats.

Having thus described and explained my invention, I claim and desire to secure by Letters Patent:

1. In vehicle seat upholstery of the class described and in combination with a vehicle body having a seat supporting frame, and an upper rail located adjacent the upper end of the seat; an upholstery supporting frame having a top rail overlying said upper rail, a bottom rail disposed adjacent said seat supporting frame, and a plurality of bars extending between and the ends of which are secured to said top and bottom rails; a plurality of stop members carried by the upper rail aforesaid and projecting above the upper edge thereof, and the free ends of which lie in front of the top rail of said frame; a plurality of resilient clips secured to said bars and the free ends of which lie beneath the upper rail aforesaid when said frame is in place; and suitable upholstery carried by said frame.

2. In vehicle seat upholstery of the class described and in combination with a vehicle body having a seat supporting frame, and an upper rail located adjacent the upper end of the seat; an upholstery supporting frame having a top rail overlying said upper rail, and a plurality of bars extending downwardly from said top rail and terminating adjacent said seat supporting frame; a plurality of stop members carried by the upper rail aforesaid and projecting above the upper edge thereof, and the free ends of which lie in front of the top rail of the frame; a plurality of resilient clips carried by said frame and the free ends of which engage the under side of the upper rail aforesaid when the frame is in place; and suitable upholstery carried by said frame.

3. In vehicle seat upholstery of the class described and in combination with a vehicle body having a seat supporting frame, and an upper rail located adjacent the upper end of the seat; an upholstery supporting frame having a top rail overlying said upper rail, a bottom rail disposed adjacent said seat supporting frame, and a plurality of bars extending between and the ends of which are secured to said top and bottom rails; a plurality of stop members carried by the upper rail aforesaid and projecting above the upper edge thereof, and the free ends of which lie in front of the top rail of said frame; and suitable upholstery carried by said frame.

4. In vehicle seat upholstery of the class described and in combination with a vehicle body having a seat supporting frame, and an upper rail located adjacent the upper end of the seat; an upholstery supporting frame having a top rail overlying said upper rail, and a plurality of bars extending downwardly from said top rail and terminating adjacent said seat supporting frame; a plurality of stop members carried by the upper rail aforesaid and projecting above the upper edge thereof, and the free ends of which lie in front of the top rail of said frame; and suitable upholstery carried by said frame.

5. In vehicle seat upholstery of the class described, a vehicle body; an upper rail located adjacent the upper end of said body; an upholstery supporting frame having a top rail supported upon said upper rail, and a plurality of bars extending downward from said top rail; a plurality of projections carried by said upper rail and adapted to engage the front side of the top rail of said frame to thereby prevent movement of said top rail relative to said upper rail; and suitable upholstery carried by said frame.

6. In vehicle seat upholstery of the class described, an upholstery supporting frame comprising a bottom rail; a plurality of vertically extending bars the lower ends of which are secured to said bottom rail; a top rail to which the upper ends of said bars are secured, and which top rail is located to one side of the plane of said bars; and a plurality of resilient clips secured to said bars and located adjacent the upper ends thereof, and the free ends of which clips are located beneath said top rail.

7. In vehicle seat upholstery of the class described, an upholstery supporting frame comprising a top rail; a bottom rail; a plurality of bars extending between and the ends of which are secured to said top and bottom rails; and a plurality of resilient clips substantially right-angular in form secured to said bars and located adjacent said top rail.

8. In combination with a vehicle body having a frame structure adapted to support various upholstery elements whereby a seat is provided; a vertically arranged upholstery supporting frame the lower end of which rests upon and is supported by a lower portion of said frame structure; and means including a resilient clamping member located adjacent the upper end of said upholstery supporting frame and engaging the upper portion of said frame structure to thereby hold the said upholstery supporting frame in place.

9. In vehicle seat upholstery of the class described, a vehicle body; an upper rail located adjacent the upper end of said body; an upholstery supporting frame having a top rail supported upon said upper rail, and a plurality of bars extending downward from said top rail; means carried by said upper rail for preventing forward movement of said top rail; means carried by said frame and engaging said upper rail for preventing vertical movement of said top rail and frame; and suitable upholstery carried by said frame.

In testimony whereof I affix my signature.

FRED W. HANNEMAN.